Patented Apr. 18, 1950

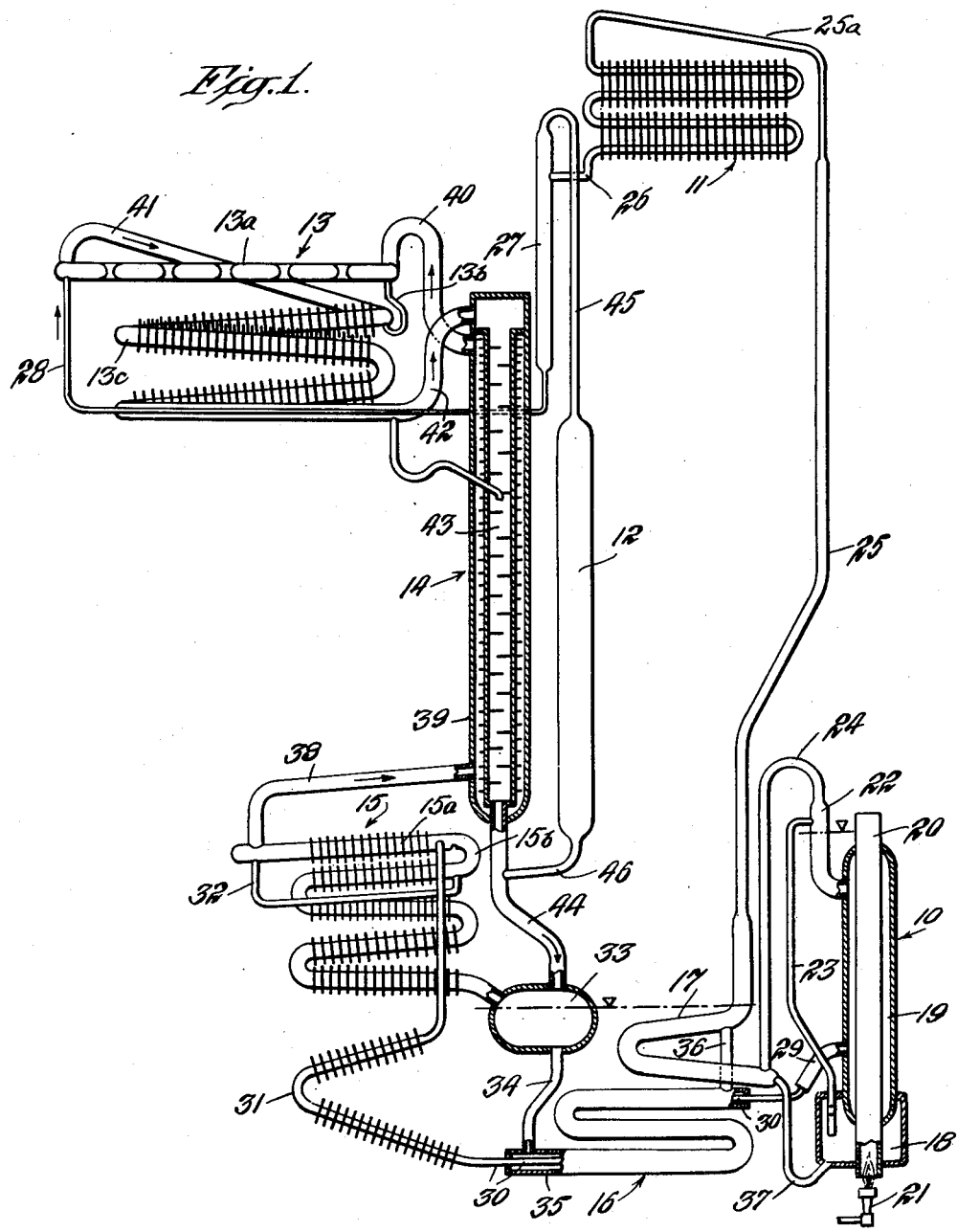

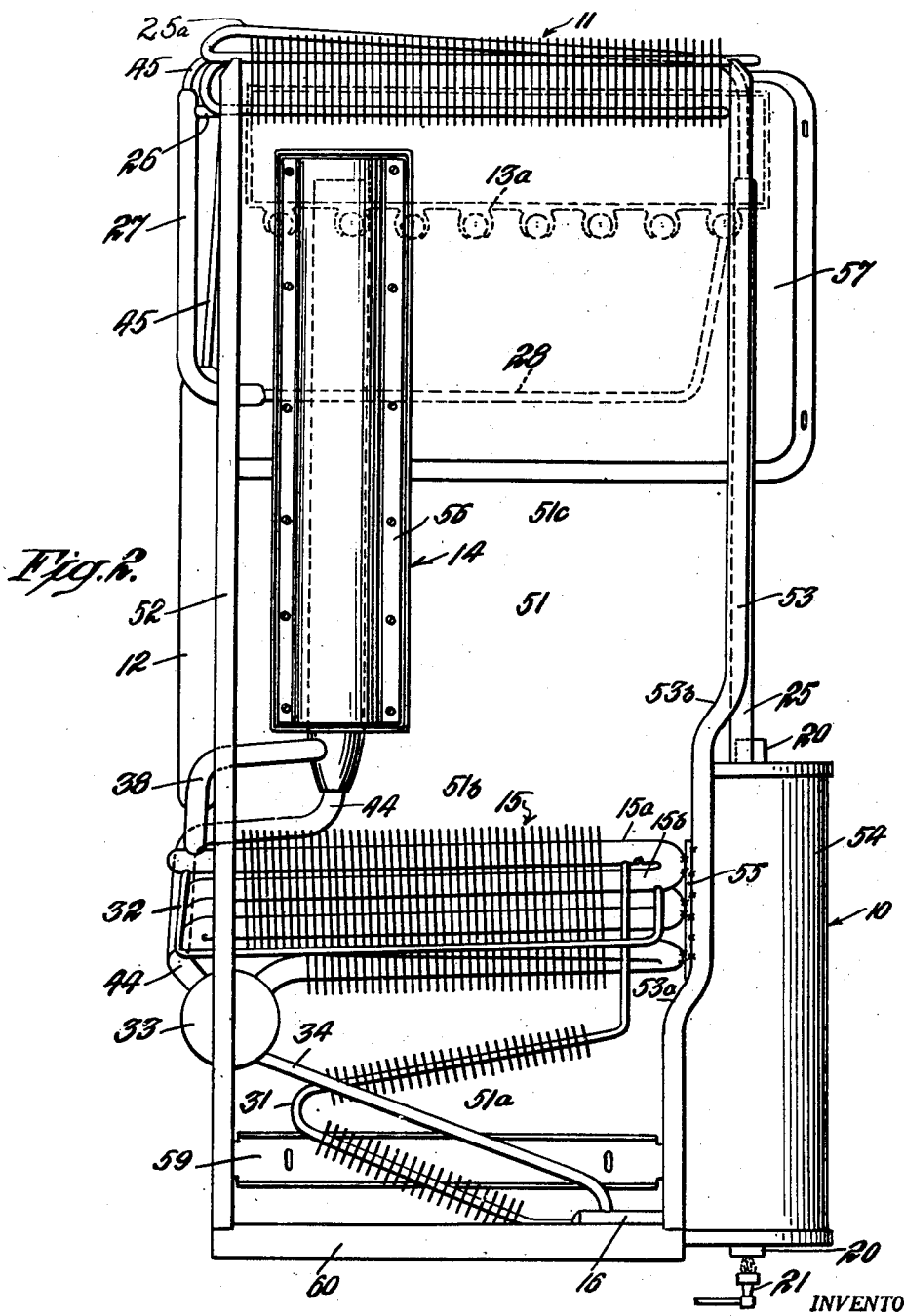

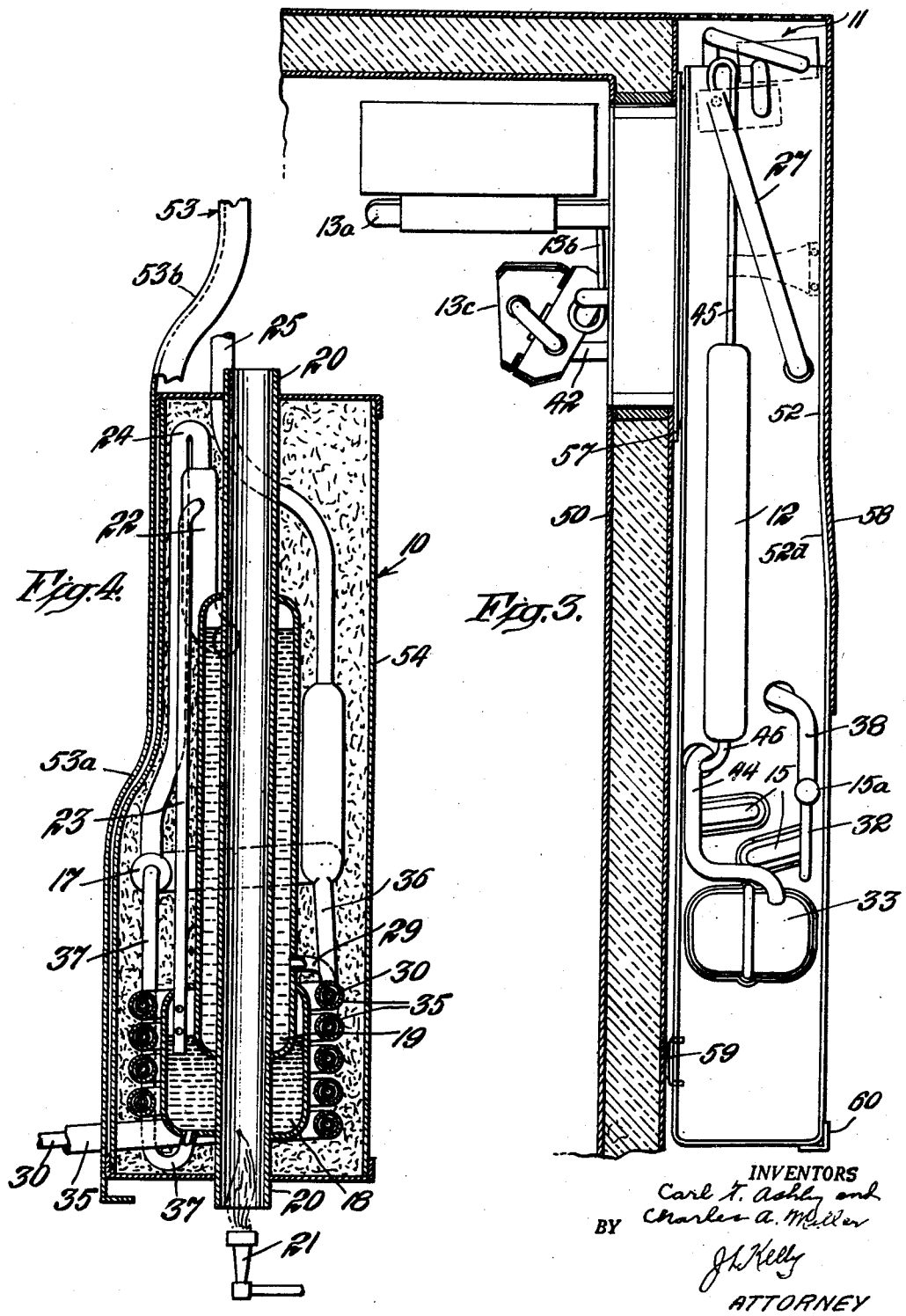

2,504,784

UNITED STATES PATENT OFFICE 2,504,784

REFRIGERATION

Carl T. Ashby and Charles A. Miller, Evansville, Ind., assignors to Servel, Inc., New York, N. Y., a corporation of Delaware Application November 8, 1947, Serial No. 784,896

7 Claims. (Cl. 62—119.5)

This invention relates to refrigeration and particularly air cooled absorption refrigeration apparatus of a size intended primarily for domestic use.

With absorption refrigeration apparatus wherein the heat rejecting parts, such as the absorber, condenser and analyzer, are intended to be cooled by ambient air, it is necessary that these parts be constructed and arranged in a manner that sufficient air to do a good refrigerating job pass over such parts. If the space occupied by these heat rejecting parts be of no particular moment, that is, if these parts may be spread out at will, the problem of cooling them by ambient air is not difficult. However, with domestic refrigerators conservation of space is always desirable. Therefore the heat rejecting parts of such a refrigerator should be arranged in a minimum of space commensurate with efficient performance. Furthermore, the generator or vapor expeller of such a refrigerator should be so sized and positioned as not to interfere with the cooling of the heat rejecting parts of the apparatus, while at the same time maintaining the efficiency of the apparatus.

It is therefore an object of this invention to provide a refrigerator operated by an air cooled absorption refrigerating apparatus wherein the space occupied by such apparatus is reduced to a minimum without adversely affecting the efficiency of the apparatus.

The invention together with its objects and advantages will be better understood from the following description and accompanying drawings, wherein;

Fig. 1 is an expanded or schematic view of a refrigeration apparatus incorporating my invention;

Fig. 2 is a rear elevational view, showing the apparatus of Fig. 1 assembled.

Fig. 3 is a side elevational view, partly in section, of the apparatus illustrated in Fig. 2; and Fig. 4 is a detailed rear elevational view, partly in vertical section, of the generator assembly illustrated in Figs. 1 and 2.

Referring now to Fig. 1 of the drawings, for purpose of illustration, I have incorporated my invention in an absorption refrigerating system of the uniform pressure type, which system includes generally, a generator assembly 10, a condenser 11, a pressure vessel 12, an evaporator 13, a gas heat exchanger 14, an absorber 15, a liquid heat exchanger 16, and analyzer 17 and conduits interconnecting said elements for flow of a refrigerating medium, an absorption solution and an inert pressure-equalizing gas. The system may be charged, for example, with a refrigerant-absorbent solution wherein ammonia is the refrigerant and water is the absorption medium, and wherein hydrogen is the inert pressure-equalizing gas.

The generator 10 includes a strong solution or pump chamber 18, a weak solution chamber 19 and a flue 20, which flue passes through the pump chamber and the weak solution chamber. Suitable means, such as a gas burner 21, is provided for heating the flue 20. An outwardly and upwardly projecting spout 22 is connected to the upper part of the weak solution chamber 19. A riser or vapor-lift pump 23 leads from the upper part of pump chamber 18 and is connected to the upper end of spout 22 above the uppermost part of the weak solution chamber 19. Spout 22 is connected by a conduit 24 which leads from the upper part of the spout to the lower portion of the analyzer 17, and the upper portion of the analyzer is connected by a conduit 25 to the upper or inlet end of the condenser 11. A rectifier 25$^a$ is provided in the upper portion of conduit 25. A drain conduit 26, having an enlarged portion 27 and a reduced portion 28, connects the outlet of the condenser 11 to one end of a low-temperature section 13$^a$ of the evaporator 13. The opposite end of evaporator section 13$^a$ is connected by a drain conduit 13$^b$ to a high-temperature section 13$^c$ of the evaporator.

Weak solution chamber 19 of the generator is connected by a conduit 29, an inner passage 30 of liquid heat exchanger 16, and a conduit 31 to the uppermost section 15$^a$ of the absorber. A conduit 32 connects the outlet end of section 15$^a$ of the absorber to the next lower section 15$^b$ thereof. The lower portion of the absorber is connected by an absorber vessel 33, a conduit 34, an outer passage 35 of the liquid heat exchanger, a conduit 36, analyzer 17, and a conduit 37 to pump chamber 18 of the generator.

The upper part of the absorber is connected by a conduit 38, an outer passage 39 of the gas heat exchanger, and a conduit 40 to the inert gas inlet end of section 13$^a$ of the evaporator. The inert gas outlet end of evaporator section 13$^a$ is connected by a conduit 41 to the inert gas inlet end of evaporator section 13$^c$, and the outlet end of this evaporator section is connected by a conduit 42, an inner passage 43 of the gas heat exchanger, a conduit 44, and absorber vessel 33 to the lower end of the absorber. As shown in Fig. 1, the horizontal portion of conduit 28 is placed in heat exchange relation with the horizontal portion of conduit 42, whereby liquid refrigerant flowing from the condenser to the evaporator is precooled by the cold gas flowing from the evaporator toward the absorber. Pressure vessel 12 is connected at its upper end to conduit 27 by a conduit 45, and at its lower end the pressure vessel is connected by a conduit 46 to the conduit 44 leading to the absorber vessel.

As shown, particularly in Fig. 4, the generator pump chamber 18 is arranged slightly off-center with respect to the generator flue 20, and the lower portion of weak solution chamber 19 projects into the upper portion of the pump chamber. With this arrangement a vapor space is provided in the upper portion of the pump chamber in a manner that ample space is afforded for locating the lower portion of vapor-lift pump 23 within the upper portion of the pump chamber and in a manner that the vapor space of the pump chamber is never directly exposed to the hot surface of flue 20. The liquid heat exchanger 16, which includes concentric conduits 30 and 35, is wrapped concentrically around the pump chamber as a helical coil, the convolutions of which coil are substantially horizontal. The analyzer 17, which is substantially horizontal and U-shaped in horizontal section, is placed in spaced relation around the weak solution chamber 19.

Referring now to Figs. 2 and 3 of the drawing, in accordance with my invention, the low and high temperature sections of the evaporator are mounted within a refrigerator cabinet indicated generally by reference character 50, the absorber, condenser and rectifier are arranged within a vertical flue 51 at the rear of the cabinet, and the generator assembly is mounted at the rear of the cabinet exteriorly of the vertical flue. Flue 51 includes a pair of side rails 52 and 53 each of which consists of an outwardly facing channel member. As viewed in Fig. 2, that is looking at the rear of the apparatus, the side rail 52 is substantially straight, whereas side rail 53 is provided with two offset portions 53ª and 53ᵇ. In this manner the flue 51 is formed with three widths, a relatively narrow lower portion 51ª, an intermediate portion of intermediate width 51ᵇ and an upper wide portion 51ᶜ. In viewing the apparatus from the side, as in Fig. 3, each of the side rails is provided with an offset portion at the rear thereof, only the offset portion 52ᵈ of side rail 52 appears in Fig. 3. In this manner the lower and intermediate portions of the flue are deeper than the upper portion thereof.

As shown in Figs. 2 and 4, the generator assembly 10 is encased in an insulation box 54 and is so shaped that it fits partly within the offset portions of the side rail 53 exteriorly of the flue 51. The absorber 15, which is located within the intermediate portion 51ᵇ of the vertical flue, projects through openings in the side rail 52, whereby the left hand side of the absorber, as viewed in Fig. 2, is supported by the side rail 52, while the right hand portion of the absorber is welded to a supporting plate 55, which supporting plate is welded to or otherwise secured to the side rail 53.

The condenser 11 is located in the upper or wide portion of the vertical flue and is attached as by welding to each of the side rails 52 and 53. The conduit 25 which connects the generator assembly 10 with the condenser 11 is located within the flanges of side rail 53 exteriorly of the vertical flue, as shown in Fig. 2. The upper inclined portion, 25ª, of conduit 25 is located above the condenser and functions as a rectifier. The gas heat exchanger 14 is provided with an insulation box 56 and is located in a vertical position within the upper portion, 51ᶜ, of the vertical flue. Pressure vessel 12 is located outside of the vertical flue and is supported in any suitable manner upon side rail 52. The absorber vessel 33 is located within an opening in the side rail 52 and is spot welded or otherwise secured to this side rail.

For sake of clarity in illustration only the low-temperature section 13ª of the evaporator is shown in Fig. 2, the high-temperature section of the evaporator and the connections between the two evaporator sections having been omitted in this figure. A mounting plate 57 is attached to the front of the side rails and functions as a means for attaching the refrigerating apparatus to the cabinet 50. A rear panel 58 is mounted on the rear of the side rails and extends from the upper portion of the absorber to the top of the refrigerator, thereby closing the flue 51 above the absorber, the lower portion of the flue being open at both the front and rear. This rear panel 58 is shown only in Fig. 3. A channel member 59 is affixed to lower front portions of the side rails for attaching the apparatus to the lower portion of the cabinet. A reenforcing angle member 60 connects the lower portions of the side rails 52 and 53.

From the above it is seen that our improved manner of locating and mounting the refrigerating apparatus at the rear of the cabinet provides a compact arrangement whereby available space is used to the best advantage. The heat rejecting parts of the apparatus, that is the absorber, condenser and rectifier are located in the vertical flue in a manner that provides an efficient transfer of heat from these elements to cooling air passing up the flue. The generator assembly, that is, the generator proper, the liquid heat exchanger, the analyzer and connecting conduits are so arranged and shaped as to occupy a minimum of space at the rear of the cabinet outside of the vertical flue, so as not to interfere with the flow of cooling air upward through the flue.

In operation, with heat applied to the generator flue 20 by burner 21, refrigerant vapor is expelled from solution in pump chamber 18, which vapor lifts absorption solution through vapor-lift 23 into the upper portion of spout 22 from whence the absorption solution flows into weak solution chamber 19 wherein additional heat is applied to the solution in this chamber and additional refrigerant vapor is expelled therefrom. The refrigerant vapor from vapor-lift 23 and from weak solution chamber 19 flows from the upper portion of spout 22 through conduit 24 into and through the analyzer in counterflow relation with strong absorption solution, which solution flows through conduit 36 into the opposite end of the analyzer. From the analyzer, the refrigerant vapor flows through conduit 25 and rectifier 25ª into condenser 11.

The vapor is condensed in the condenser, giving up its heat of condensation to air flowing upward in the vertical flue, and the liquid refrigerant produced thereby flows through conduits 26, 27 and 28 into low-temperature section 13ª of the evaporator. In passing through the horizontal portion of conduit 28, the liquid refrigerant is precooled by transfer of heat therefrom to cold rich gas passing through the horizontal portion of conduit 42. Inert gas weak in refrigerant flows through conduit 40 into the gas inlet end of section 13ª of the evaporator, wherein the liquid refrigerant evaporates and diffuses into the inert gas producing the desired refrigerating effect in the low-temperature section of the evaporator. The partially enriched inert gas flows from section 13ª of the evaporator through conduit 41 into high-temperature section 13ᶜ of the evaporator, wherein this inert gas flows concurrently with liquid refrigerant that flows through drain 13ᵇ into the high-temperature section, whereby a refrigerating effect is produced in this section of the evaporator.

The rich mixture of inert gas and refrigerant vapor flows from the high-temperature section of the evaporator through conduit 42, inner passage 43 of the gas heat exchanger, conduit 44, and absorber vessel 33 into the lower portion of the absorber. Absorption solution weak in refrigerant is conveyed by conduit 31 into the upper section, 15ᵃ, of the absorber wherein the absorption solution flows downward toward conduit 38 tending to push the inert gas toward said conduit, thereby initiating and maintaining the flow of inert gas in the proper direction in the inert gas circuit. Absorption solution flows from section 15ᵃ of the absorber through conduit 32 into section 15ᵇ thereof, from whence the absorption solution flows downward through the remainder of the absorber in counterflow relation to the upward-flowing mixture of inert gas and refrigerant vapor, whereby the refrigerant vapor is absorbed in the absorption solution. The inert gas stripped of refrigerant vapor flows from the upper part of the absorber through conduit 38, outer passage 39 of the gas heat exchanger, and conduit 40 back to the low-temperature section of the evaporator. The heat generated by the absorption of refrigerant vapor into absorption liquid in the absorber is given up to cooling air passing upward in the vertical flue over the absorber.

The absorption solution enriched in refrigerant vapor flows from the lower portion of the absorber into absorber vessel 33, and from there the enriched absorption solution flows through conduit 34, outer passage 35 of the liquid heat exchanger, and conduit 36 into the upper part of the analyzer 17. In the analyzer, the enriched absorption solution flows in counter-current relation to refrigerant vapor en route to the condenser. From the analyzer, the rich absorption solution flows through conduit 37 into the lower portion of pump chamber 18, wherein refrigerant vapor is expelled from solution and the absorption solution is lifted through riser 23 into spout 22 by vapor-lift action, as explained above. Weak absorption solution flows from the lower portion of weak solution chamber 19 through conduit 29, inner passage 30 of the liquid heat exchanger, and conduit 31 back to the upper portion of the absorber.

Having thus described our invention, we wish it to be understood that we do not desire to be limited to the exact details of construction illustrated and described, for obvious modifications may occur to a person skilled in the art.

What is claimed is:

1. An absorption refrigerating apparatus comprising a cabinet having a food storage compartment and an apparatus compartment including a vertical flue at the rear of the cabinet, and a refrigerating system for cooling the food storage compartment, said refrigerating system including a generator assembly, a condenser, an evaporator, an absorber and conduits interconnecting said elements for flow of working media therethrough, said vertical flue including a pair of side rails arranged in horizontal spaced relation across the rear of the cabinet, one of which side rails is substantially straight as viewed from the rear thereof, the other of which side rails is formed with a plurality of offsets therein, the construction and arrangement being such that the vertical flue is relatively narrow at the lower portion thereof, of intermediate width intermediate the height thereof and relatively wide at its upper portion.

2. A refrigerating apparatus as set forth in claim 1 wherein the generator assembly includes a vertical generator having an offset portion in one side thereof and wherein the generator assembly is located outside of the vertical flue with the offset portion thereof fitting into an offset portion of said other side rail.

3. A refrigerating apparatus as set forth in claim 2 wherein the absorber includes a plurality of coils located within the vertical flue in the intermediate portion thereof.

4. An absorption refrigeration apparatus as set forth in claim 3 wherein the condenser includes a plurality of coils located in the upper portion of the flue.

5. A refrigerating apparatus as set forth in claim 4 wherein each of the side rails, when viewed from the side thereof, is provided with an offset portion intermediate its height at the rear thereof, whereby the relatively narrow and intermediate portions of the vertical flue are deeper than the upper wide portion thereof.

6. A refrigerating apparatus comprising a cabinet having a food storage compartment and an apparatus compartment including a vertical flue at the rear of the cabinet, and a refrigerating system for cooling said food storage compartment, said refrigerating system including a generator assembly, a condenser, an evaporator, an absorber and conduits interconnecting said elements for flow of working media therethrough, said vertical flue including a relatively narrow lower portion, an intermediate portion of intermediate width and an upper wide portion, said generator assembly including a relatively wide lower portion located exteriorly of the vertical flue at one side thereof immediately adjacent the narrow portion thereof and an upper portion of less width located exteriorly of the flue immediately adjacent the intermediate portion thereof, said absorber including a plurality of coils extending from one side to the other side of the flue in the intermediate portion thereof, and said condenser including a plurality of coils extending from one side to the other side of the flue in the upper wide portion thereof.

7. A refrigerating apparatus as set forth in claim 6 wherein the wide lower portion of the generator assembly includes a pump chamber with a liquid heat exchanger coiled thereabout, a weak solution chamber above said pump chamber and an analyzer coiled about at least a portion of said weak solution chamber.

CARL T. ASHBY.
CHARLES A. MILLER.

REFERENCES CITED

The following references are of record in the file of this patent:

UNITED STATES PATENTS

| Number | Name | Date |
|---|---|---|
| 2,037,782 | Hainsworth | Apr. 21, 1936 |
| 2,350,249 | Osborn | May 30, 1944 |